United States Patent [19]
Matueda et al.

[11] 3,888,827
[45] June 10, 1975

[54] 1,2-EPOXY RESIN COMPOSITIONS CONTAINING AMINIMIDE COMPOUNDS

[75] Inventors: Kanji Matueda, Futatsubashi; Hideki Niino, Yokohama; Yoshitomo Nakano, Yokkaichi, all of Japan

[73] Assignees: Permachem Asia Co. Ltd.; Mitsubishi Petrochemical Co. Ltd., both of Tokyo, Japan

[22] Filed: Nov. 16, 1973

[21] Appl. No.: 416,667

[30] Foreign Application Priority Data
Nov. 20, 1972  Japan................ 47-115704

[52] U.S. Cl........... 260/47 EC; 260/47 EN; 260/59; 260/78.4 EP
[51] Int. Cl............................ C08q 30/14

[58] Field of Search........... 260/47 EN, 47 EC, 2 N, 260/2 EC, 59

[56] References Cited
UNITED STATES PATENTS

| | | | |
|---|---|---|---|
| 3,450,673 | 6/1969 | McKillip et al. | 260/361 X |
| 3,485,806 | 12/1969 | Bloomquist et al. | 117/148 X |
| 3,628,992 | 12/1971 | McKillip et al. | 260/47 X |

*Primary Examiner*—Morris Liebman
*Assistant Examiner*—T. Pertilla
*Attorney, Agent, or Firm*—Sherman & Shalloway

[57] ABSTRACT

Epoxy resin compositions of superior hardenability which consist essentially of an epoxy resin and a specific aminimide compounds as a hardener for the epoxy resin.

25 Claims, No Drawings

1,2-EPOXY RESIN COMPOSITIONS CONTAINING AMINIMIDE COMPOUNDS

This invention relates to epoxy resin compositions having superior hardening property and storage stability.

Various amine compounds are known as quick-acting hardeners for epoxy resins. There have also been proposed latent hardeners such as BF$_3$·amine complex compounds (Journal of Applied Polymer Science, Vol. 10, pages 523–524, 1966) amine·imidazole salts (U.S. Pat. No. 3,018,264), dihydrazides (U.S. Pat. Nos. 3,030,247 and 3,294,748), alkylamine boranes (Polymer Science, Vol. 12, pages 719–730, 1968), and supercoordination silicate systems (ACS Preprint, 28 (1), pages 504–511, 1968). Furthermore, when epoxy resin are cured with polycarboxylic anhydrides, there is used a hardening promotor in general use such as benzylmethyl amine, trisdimethylaminomethyl phenol, triethanolamine, ethylimidazole, or dicyandiamine. However, epoxy resin compositions containing these conventional hardening agents have strong toxicity. Or the hardening speed of these compositions is low, and high temperatures are required for hardening. Or some of such compositions have short pot life which renders then limitative in use.

Generally the properties required of satisfactory hardeners and resin compositions containing them are as follows:

1. They should have a long pot life;
2. Their hardening should not be very exothermic;
3. Their shrinkage during hardening should be minor;
4. They should not be so volatile as to be sublimable;
5. They should have low hygroscopicity;
6. They should be non-toxic (not skin-irritating);
7. They should have no corroding action against metals such as copper; and
8. They should have good physical and electrical properties.

The conventional hardeners have been unsatisfactory in one or other desirable properties mentioned above, especially in the pot life and the hardening speed of the usable composition or the physical properties of the hardened product.

The present invention provides resinous compositions containing a latent hardening promotor which satisfies all of the foregoing requirements. More particularly, the invention provides epoxy resin compositions of superior hardenability which consist essentially of an epoxy resin and, as a hardener for the epoxy resin, an aminimide compound of the formula

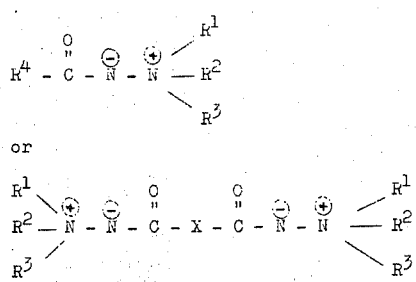

wherein $R^1$ is an alkyl group, a benzyl group or the group

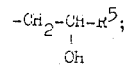

$R^2$ and $R^3$ are the same or different, and each represent an alkyl group; $R^4$ is an alkyl group, an aryl group, an aralkyl group, a cycloalkyl group, an alkoxy group, aryloxy group, an alkenyl group,

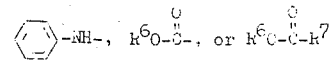

when $R^1$ is a benzyl group, and

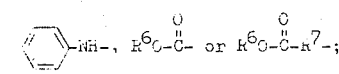

$R^5$ is a hydrogen atom, an alkyl group, an aryl group, an alkoxyalkyl group, an aryloxyalkyl group, an allyloxyalkyl group, a hydroxyalkyl group, a methacryloyloxymethyl group or an acryloxymethyl group; $R^6$ is an alkyl group, an aryl group or an aralkyl group; $R^7$ is a residue of an aliphatic, cycloaliphatic or aromatic hydrocarbon; and X is a residue of an aliphatic, cycloaliphatic or aromatic hydrocarbon or a direct bond.

In the present specification and appended claims, the term "epoxy resin" is used to denote a polyepoxide containing at least one epoxy group per molecule on an average.

Examples of the epoxy resins useful for the compositions of this invention include the following: epoxy resins obtained from an epoxy novolak such as polyorthocresolformaldehyde-poly(2,3-epoxypropyl) ether, or polyphenylformaldehyde-poly(2,3-epoxypropyl) ether, or bisphenol A, or an acetone condensate of resorcinol, and epichlorohydrin; epoxidated polyolefin resins, and epoxy resins obtained from phenolphthalein and epichlorohydrin. Among the foregoing, liquid polyglycidyls are advantageously used, a liquid polyglycidyl ether of 2,2-bis-(4-hydroxyphenyl)-propane being particularly preferred. The polyepoxide may contain minor quantities of liquid monoepoxide, such as butyl glycidyl ether, phenyl glycidyl ether, octyl glycidyl ether, and glycidyl ester of monocarboxylic acid. Those monoepoxides serve as a reactive diluent, which are concurrently used with viscous liquid polyepoxides for advantageously reducing the viscosity of the system.

Examples of the aminimide compounds of the foregoing general formula to be employed in this invention include the following:

1,1-dimethyl-1-benzylaminebenzimide
1,1-dimethyl-1-benzylaminepropionimide,
1,1-dimethyl-1-benzylamineacrylimide,
1,1-dimethyl-1-benzylaminemethacrylimide,
1,1-dimethyl-1-(2'-hydroxy-3'-allyloxypropyl) amine ethoxyoxalimide, 1,1-dimethyl-1-(2'-hydroxypropyl) amine ethoxyoxalimide,
1,1-dimethyl-1-(2'-hydroxy-2'-phenylethyl) amine ethoxyoxalimide,
1,1-dimethyl-1-(2'-hydroxy-3'-butoxypropyl) amine ethoxyoxalimide,
1,1-dimethyl-1-(2'-hydroxy-3'-phenoxypropyl) amine ethoxyoxalimide,
1,1-dimethyl-1-(2'-hydroxypropyl) amine ethoxymalonimide,
1,1-dimethyl-1-(2'-hydroxy-3'-allyloxypropyl) amine ethoxymalonimide,
1,1-dimethyl-1-(2'-hydroxy-3'-phenoxypropyl) amine ethoxymalonimide,
1,1-dimethyl-1-(2'-hydroxy-3'-methacryloyloxypropyl) amine methoxysuccinimide,
1,1-dimethyl-1-(2'-hydroxy-2'-phenylethyl) amine methoxysuccinimide,
1,1-dimethyl-1-(2'-hydroxy-3'-allyloxypropyl) amine methoxysuccinimide,
1,1-dimethyl-1-(2'-hydroxy-3'-butoxypropyl) amine methoxysuccinimide,
1,1-dimethyl-1-(2'-hydroxy-3'-phenoxypropyl) amine methoxysuccinimide,
1,1-dimethyl-1-(2'-hydroxypropyl) amine methoxyadipinimide,
1,1-dimethyl-1-(2'-hydroxy-2'-phenylethyl) amine adipinimide,
1,1-dimethyl-1-(2'-hydroxy-3'-allyloxypropyl) amine methoxyadipinimide,,
1,1-dimethyl-1-(2'-hydroxy-3'-butoxypropyl) amine methoxyadipinimide,
1,1-dimethyl-1-(2'-hydroxy-3'-phenoxypropyl) amine methoxyadipinimide,
1,1-dimethyl-1-(2'-hydroxypropyl) amine methoxysebacinimide,
1,1-dimethyl-1-(2'-hydroxy-2'-phenylethyl) amine methoxysebacinimide,
1,1-dimethyl-1-(2'-hydroxy-3'-allyloxypropyl) amine methoxysebacinimide,
1,1-dimethyl-1-(2'-hydroxy-3'-butoxypropyl) amine methoxysebacinimide,
1,1-dimethyl-1-(2'-hydroxy-3'-phenoxypropyl) amine methoxysebacinimide,
1,1-dimethyl-1-(2'-hydroxy-3'-methacryloyloxypropyl) amine methoxysebacinimide,
1,1-dimethyl-1-(2'-hydroxypropyl) amine methoxyphthalimide,
1,1-dimethyl-1-(2'-hydroxy-2'-phenylethyl) amine methoxyphthalimide,
1,1-dimethyl-1-(2'-hydroxy-3'-allyloxypropyl) amine methoxyphthalimide,
1,1-dimethyl-1-(2'-hydroxy-3'-butoxypropyl) amine methoxyphthalimide,
1,1-dimethyl-1-(2'-hydroxy-3'-phenoxypropyl) amine methoxyphthalimide,
1,1-dimethyl-1-(2'-hydroxy-3'-methacryloyloxypropyl) amine methoxyphthalimide,
1,1-dimethyl-1-(2'-hydroxypropyl) amine methoxyisophthalimide,
1,1-dimethyl-1-(2'-hydroxy-2'-phenylethyl) amine methoxyisophthalimide,
1,1-dimethyl-1-(2'-hydroxy-3'-allyloxypropyl) amine methoxyisophthalimide,
1,1-dimethyl-1-(2'-hydroxy-3'-butoxypropyl) amine methoxyisophthalimide,
1,1-dimethyl-1-(2'-hydroxy-3'-phenoxypropyl) amine methoxyisophthalimide,
1,1-dimethyl-1-(2-hydroxy-3'-methacryloyloxypropyl) amine methoxyisophthalimide,
1,1-dimethyl-1-(2'-hydroxypropyl) amine methoxyterephthalimide,
1,1-dimethyl-1-(2'-hydroxy-2'-phenylethyl) amine methoxyterephthalimide,
1,1-dimethyl-1-(2'-hydroxy-3'-allyloxypropyl) amine methoxyterephthalimide,
1,1-dimethyl-1-(2'-hydroxy-3'-butoxypropyl) amine methoxyterephthalimide,
1,1-dimethyl-1-(2'-hydroxy-3'-phenoxypropyl) amine methoxyterephthalimide,
1,1-dimethyl-1-(2'-hydroxy-3'-methacryloyloxypropyl) amine methoxyterephthalimide,
1,1,1-trimethylamine phenylcarbamoylimide,
bis-trimethylamine oxalimide,
bis-triethylamine oxalimide,
bis-dimethylbenzylamine oxalimide,
bis-1,1-dimethyl-1-(2'-hydroxyethyl) amine oxalimide,
bis-1,1-dimethyl-1-(2'-hydroxy-2'-phenylethyl) amine oxalimide,
bis-1,1-dimethyl-1-(2'-hydroxy-3'-phenoxypropyl) amine oxalimide,
bis-1,1-dimethyl-1-(2'-hydroxy-3'-butoxypropyl) amine oxalimide,
bis-1,1-dimethyl-1-(2'-hydroxy-3'-allyloxypropyl) amine oxalimide,
bis-1,1-dimethyl-1-(2'-hydroxy-3'-methacryloyloxypropyl) amine oxalimide, and
bis-1,1-dimethyl-1-(2',3'-dihydroxypropyl) amine oxalimide.

The aminimide compound useful for the present invention can be obtained either by reacting an asymmetric alkylhydrazine with an epoxy compound and a carboxylic acid ester in a solvent such as an alcohol, or by quaternizing an asymmetric alkylhydrazide of a carboxylic acid or carbanilic acid with an alkyl halide, and then dehydrohalogenating the product with a base. After the reaction, the solvent and unreacted compounds are distilled off from the reaction mixture under reduced pressure.

The above reaction can be respectively expressed by the following formula:

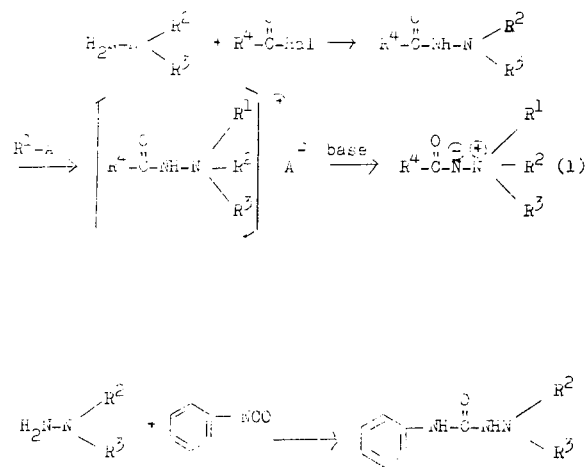

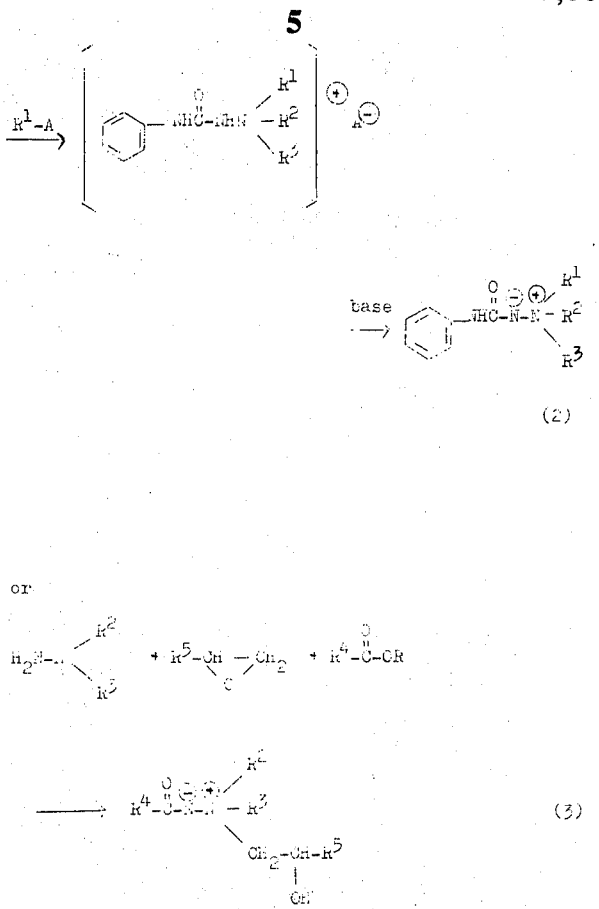

In the above formulas, $R^1$ through $R^5$, through R is an alkyl group, Hal is a halogen atom, and A is an anion.

The details of the above processes for the preparation of aminimides compounds are disclosed, for example, in the following literature references.

A. *J. Org. Chem.* 33, 1374 (1968)
B. Japanese Patent Publication No. 9367/70
C. *Canadian J. Chem.* 45 2619 (1967)
D. *J. Polymer Sci.:* Part A-I 6 2197 (1968)
E. *J. Chem. Eng. Data* 12 612 (1967)

In practising the present invention, the ratio between the aminimide compound and the epoxy resin is not critical. However, the preferred quantitative ratio of the amimimide compound is 0.1 to 15, especially 1 to 10 parts by weight based on 100 parts by weight of epoxy resin.

The composition of this invention may contain the aminimide compound alone as a hardening agent for the epoxy resin, but may also be formed into a two-package composition by employing both a polycarboxylic anhydride and the aminimide compound as the hardener.

Where an aminimide compound alone is used as the hardener, the aminimide compound may be used in an amount of 5 to 15 parts by weight, or preferably 8 to 10 parts by weight based on 100 parts by weight of epoxy resin. When the aminimide compound is used together with the polycarboxylic acid, the amount of the aminimide compound may be reduced to 0.1 to 5 parts by weight, preferably 0.1 to 2 parts by weight, based on 100 parts by weight of epoxy resin.

If the content of the aminimide compound exceeds 15 parts by weight, the pot life of the composition is shortened and the mechanical rigidity of the hardened resin is reduced. If the aminimide compound content is less than 0.1 part by weight, the hardening time will be extended.

Examples of the polycarboxylic anhydride are as follows: tetrahydrophthalic anhydride, hexahydrophthalic anhydride, maleic anhydride, itaconic anhydride, citraconic anhydride, succinic anhydride, dichlorosuccinic anhydride, 3,4,5,6,7,7-hexachloro-3,6-endomethylene-1,2-tetrahydrophthalic anhydride (chlorendic anhydride), dodecylsuccinic anhydride, dodecenylsuccinic anhydride, 3,6-endomethylenetetrahydrophthalic anhydride, methyl-3,6-endomethylenetetrahydrophthalic anhydride, trimellitic anhydride, polyazelaic anhydride, pyromellitic dianhydride, benzophenone3,4,3',-4'-tetracarboxylic acid, half esters of glycols and of glycerol with trimellitic anhydride, and mixtures of the foregoing. Those polycarboxylic acid anhydride are well known as the hardener of epoxy resin.

The equivalent ratio of the polycarboxylic acid anhydride to the polyepoxide in the two-package epoxy resins of this invention is preferably 0.6:1 to 1.2:1, while that of the dicarboxylic acid anhydride is approximately 1:1. If a chlorinated polycarboxylic acid is used, the preferred range is approximately 0.6:1.

The composition of this invention contains an epoxy resin and the aminimide compound, and if desired, further contains a polycarboxylic anhydride and a known hardening promotor such as phenols, phosphites, benzylmethyl amine, trisdimethylaminomethyl phenol, triethanolamine, ethylmethyl imidazole, or dicyandiamide. It is possible to impart thixotropic properties to the composition of this invention by, for example, Aerosil (trademark for submicroscopic pyrogenic silica useful as a thixotropic agent).

The epoxy resin compositions of the invention may further contain a solvent or diluent such as xylene, dibutyl phthalate, tricresyl phosphate, phenyl glycidyl ether, butyl glycidyl ether, styrene oxide, and allyl glycidyl ether, a filler such as finely divided minerals, for example, silica gel, glass fibers, asbestos, or sand, a pigment, a softening agent, other resins, asphalt, tar a stabilizer, an insecticide, a dyestuff, a plasticizer, and other conventionally employed additives.

The hardener employer in accordance with the invention imparts high strength to the hardened resin. Furthermore, the hardener is stable at room temperature, is non-volatile, and has no objectionable odor and little toxicity. Thus, the hardener is very convenient for handling as compared with the conventionally employed amines.

The resinous compositions of the invention have a long pot life, can be stored for prolonged period of time as a blend of the epoxy resin and hardener. For example, when the composition is allowed to stand at a temperature of 40°C., there is hardly any rise in viscosity with the passage of time, and the composition can be stored for more than 1 month. The composition shows usually favorable performance after a long period of storage.

The hardening of the composition of this invention is effected by heating it to temperatures higher than room temperature, normally ranging from 80° to 200°C. While the foregoing temperature range is suitable for many purposes, temperatures higher than 200°C. may be employed if so desired.

The epoxy resin compositions of this invention have a wide range of important utility. For example, they can be used as adhesives, paints, coating materials, electrically insulating materials, laminates and construction materials.

The following Examples illustrate the present invention. Unless otherwise specified, all parts appearing in the Examples are by weight.

The bending strength and the tensile strength were measured in accordance with JIS-K 6911. The heat distortion temperature was measured in accordance with JIS-K 6714. The gelling time was measured in accordance with JIS-C 2104. The pot life was evaluated by measuring changes in viscosity after if was stored for 40°C. in an incubator or at room temperature.

EXAMPLE 1

Ten parts of 1,1-dimethyl-1-benzylamine benzimide (light yellow solid) was dispersed in 100 parts of Epikote 828 (tradename for diglycidyl ether epoxy resin of bisphenol A having an epoxy equivalent of about 190, the product of Shell International Chemical Corporation). Changes in viscosity of this composition at 40°C. were determined. It was found that the viscosity scarcely rose after a lapse of 1 month, and the pot life of this composition is more than 1 month.

When 100 g of this composition was heated at 100°C., it did not gel even after heating for 8 hours. On the other hand, when it was heated at 150°C., it turned into a solid hardened product in 3 hours. This indicates that the aminimide compound used has very high activity as a hardening agent.

When this composition was cast by a conventional method and gelled at 130°C., and then hardened at 180°C. for 5 hours. The hardened product had a bending strength of 1050 Kg/cm$^2$ and a heat distortion temperature of 82°C.

EXAMPLE 2

Ten parts of 1,1-dimethyl-1-benzylamine propionimide (light yellow solid) was dispersed in 100 parts of Epikote 828. The pot life of this composition was more than 1 month at 40°C.

When 100 g of this composition was heated at 100°C., the hardening was slow and it did not gel even after heating for 8 hours.

EXAMPLE 3

Ten parts of 1,1-dimethyl-1-benzylamine methacrylimide (light yellow solid) was dispersed in 100 parts of Epikote 828. 100 grams of this composition hardened in 3 hours at 100°C., in 2 hours at 150°C., and in 1 hour at 180°C. to give a hardened product.

EXAMPLE 4

80 parts of hexahydrophthalic anhydride and 1 part of 1,1-dimethyl-1-benzylamine benzimide were dispersed in 100 parts of Epikote 828. The resulting composition had a pot life of about one month at room temperature.

When 100 g of this composition was heated at 150°C., it was gelled in 3 minutes. A hardened product obtained by hardening the composition at 150°C. for 4 hours has a tensile strength of 540 Kg/cm$^2$ and a heat distortion temperature of 125°C.

EXAMPLE 5

80 parts of hexahydrophthalic anhydride and 1 part of 1,1-dimethyl-1-benzylamine propionimide were dispersed in 100 parts of Epikote 828. The resulting composition had a pot life of about one month at room temperature. When this composition was heated at 150°C., it was hardened in 4 minutes.

EXAMPLE 6

80 parts of hexahydrophthalic anhydride and 1 part of 1,1-dimethyl-1-benzylamine methacrylimide were dispersed in 100 parts of Epikote 828. The resulting composition had a pot life of about one month at room temperature, and when heated at 150°C., was hardened in 2.7 minutes.

EXAMPLE 7

80 parts of 3,6-endomethylenetetrahydrophthalic anhydride and 2 parts of 1,1-dimethyl-1-benzylamine benzimide were dispersed in 100 parts of Epikote 828. The resulting composition had a pot life of more than 2 months at room temperature. This composition was gelled in 20 minutes when heated at 170°C. On the other hand, a composition containing no amineimide compound stated above was not gelled even when heated at 170°C. for 5 hours.

EXAMPLE 8

36 parts of hexahydrophthalic anhydride and 1 part of 1,1-dimethyl-1-benzylamine benzimide were mixed with 100 parts of Epikote 1001 (tradename for diglycidyl ether epoxy resin of bisphenol A having an epoxy equivalent of about 450 to 500, the product of Shell International Chemicals Corporation) using a roll mill at 80°C. for 5 minutes. The resulting composition was gelled in 7 minutes when heated at 150°C., and had a pot life of more than one month at 40°C.

COMPARATIVE EXAMPLE 1

80 parts of hexahydrophthalic anhydride and 1 part of trisdimethylaminophenol as a promotor were mixed with 100 parts of Epikote 828. The resulting composition had a pot life of only 4 days. When this composition was heated at 150°C. for 4 hours, the resulting hardened product had a heat distortion temperature of 128°C.

COMPARATIVE EXAMPLE 2

90 parts of methyl-endomethylenetetrahydrophthalic anhydride and 1 part of trisdimethylaminophenol were mixed with 100 parts of Epikote 828. The resulting composition had a pot life of only 5 days at room temperature. When the composition was heated for 20 hours at 125°C., the resulting hardened product had a heat distortion temperature of 125°C.

EXAMPLE 9

Ten parts of 1,1-dimethyl-1-(2'-hydroxy-3'-butoxypropyl) amine ethoxyoxalimide was dissolved in 100 parts of Epikote 828. The resulting composition was stored at 40°C., and changes in viscosity of the composition with the passage of time were determined. It was found that during a period of about one month, there was scarcely any rise in viscosity, and the composition had a pot life of more than one month.

When 100 g of this composition wss heated at 155°C., it was harded in 45 minutes to give a solid hardened product. When it was heated at 185°C., a similar hardened product was obtained in 20 minutes.

EXAMPLE 10

Ten parts of 1,1-dimethyl-1-(2'-hydroxy-3'-allyloxypropyl) amine ethoxyoxalimide was dissolved in 100 parts of Epikote 828. The resulting composition had a pot life of 1.5 months at 40°C.

When 100 g of this composition was heated at 155°C., it was hardened in 45 minutes to give a solid hardened product. When it was heated at 185°C., it was hardened in 30 minutes to a similar hardened product. When it was heated at 125°C., it was necessary to maintain the composition at this temperature for as long as 150 minutes until a similar hardened product was obtained.

The composition was cast by a customary method, and gelled at 130°C. and hardened at 180°C. for 5 hours. The hardened product had a heat distortion temperature of 78°C.

EXAMPLE 11

Ten parts of 1,1-dimethyl-1-(2'-hydroxypropyl) amine ethoxymalonimide was dissolved in 100 parts of Epikote 828. The resulting composition had a pot life of one month at 40°C. When 100 g of this composition was heated at 155°C., it was hardened in 60 minutes to give a solid hardened product. When it was heated at 185°C., it was hardened in 30 minutes.

EXAMPLE 12

Ten parts of 1,1-dimethyl-1-(2'-hydroxypropyl) amine methoxysuccinimide was dissolved in 100 parts of Epikote 828. The resulting composition had a pot life of 2 months at 40°C. When 100 g of this composition was heated at 155°C., it was hardened in 60 minutes.

EXAMPLE 13

80 parts of hexahydrophthalic anhydride and 1 part of 1,1-dimethyl-1-(2'-hydroxy-3'-butoxypropyl) amine ethoxyoxalimide were mixed with 100 parts of Epikote 828. The resulting mixture had a pot life of 3 weeks at room temperature.

When 0.1 g of this composition was heated at 150°C., it was gelled in 2 minutes.

The composition was cast by a customary method and heated at 150°C. for 4 hours to give a hardened product. This hardened product had a heat distortion temperature of 123°C.

EXAMPLE 14

80 parts of methyl-endomethylenetetrahydrophthalic anhydride and 2 parts of 1,1-dimethyl-1-(2'-hydroxypropyl) amine ethoxymalonimide were mixed with 100 parts of Epikote 828. The resulting composition had a pot life of one month at room temperature.

When 0.1 g of this composition was heated at 170°C., it was gelled in 20 minutes.

COMPARATIVE EXAMPLE 3

80 parts of hexahydrophthalic anhydride and 1 part of trisdimethylaminomethylphenol were mixed with 100 parts of Epikote 828. The resulting composition had a pot life of only 4 days at room temperature.

When this composition was heated at 150°C. for 4 hours, the resulting hardened product had a heat distortion temperature of 128°C.

COMPARATIVE EXAMPLE 4

90 parts of methyl-endomethylenetetrahydrophthalic anhydride and 1 part of trisdimethylaminomethylphenol were mixed with 100 parts of Epikote 828. The resulting composition had a pot life of only 5 days at room temperature.

When this composition was heated at 125°C. for 20 hours, the resulting hardened product had a heat distortion temperature of 125°C.

EXAMPLE 15

Ten parts of bis-1,1-dimethyl-1-(2'-hydroxypropyl) amine oxalimide (white crystals) was dispersed in 100 parts of Epikote 828. Changes in viscosity of this composition at 40°C. were determined. It was found that there was hardly any rise in viscosity even after a lapse of 2 months, and it has a pot life of more than 2 months.

When 100 g of this composition was heated at 155°C., it was hardened in 30 minutes. When it was heated at 185°C., it was turned into a solid hardened product in 10 minutes. It is seen from this that the amineimide compound used is very stable at room temperature, and it had extremely high activity by heating.

The composition was cast by a customary method, and gelled at 130°C. and then hardened at 180°C. for 5 hours. The resulting hardened product had a bending strength of 1400 Kg/cm$^2$ and a heat distortion temperature of 80°C.

EXAMPLE 16

Ten parts of bis-1,1-dimethyl-1-(2'-hydroxy-3'-allyloxypropyl) amine oxalimide (light yellow liquid) was dispersed in 100 parts of Epikote 828. The resulting composition had a pot life of 15 days at 40°C. When 100 g of this composition was heated at 155°C., a hardened product was obtained in 20 minutes.

EXAMPLE 17

Ten parts of bis-1,1-dimethyl-1-(2'-hydroxy-3'-phenoxypropyl) amine oxalimide (light yellow liquid) was dispersed in 100 parts of Epikote 828. The resulting composition was hardened in 1 hour at 125°C., in 30 minutes at 155°C., and in 10 minutes at 185°C. to give a solid hardened product.

EXAMPLE 18

80 parts of hexahydrophthalic anhydride and 1 part of bis-1,1-dimethyl-1-(2'-hydroxypropyl) amine oxalimide were dispersed in 100 parts of Epikote 828. The resulting composition had a pot life of one month at room temperature. When 100 g of this composition was heated at 150°C., it was gelled in 25 minutes. A hardened product obtained by heating it at 150°C. for 4 hours had a tensile strength of 550 Kg/cm$^2$ and a heat distortion temperature of 130°C.

EXAMPLE 19

80 parts of hexahydrophthalic anhydride and 1 part of bis-1,1-dimethyl-1-(2'-hydroxy-3'-butoxypropyl) amine oxalimide (yellow liquid) were dispersed in 100 parts of Epikote 828. The resulting composition has a pot life of about 3 weeks at room temperature. When it was heated at 150°C., it was hardened in 2 minutes.

EXAMPLE 20

80 parts of methyl-endomethylenetetrahydrophthalic anhydride and 2 parts of bis-1,1-dimethyl-1-(2'-hydroxy-3'-methacryloyloxypropyl) amine oxalimide (white solid) were dispersed in 100 parts of Epikote 828. The resulting composition had a pot life of more than 2 months at room temperature. When heated at 170°C., this composition was gelled in 15 minutes. A composition not containing the above aminimide compound was not gelled even when heated at 170°C. for 5 hours.

COMPARATIVE EXAMPLE 5

80 parts of hexahydrophthalic acid and 1 part of trisdimethylaminophenol as a promotor were mixed with 100 parts of Epikote 828. The resulting composition had a pot life of only 4 days at room temperature. When this composition was heated at 150°C. for 4 hours, the resulting solid hardened product has a heat distortion temperature of 128°C.

COMPARATIVE EXAMPLE 6

90 parts of methyl-endomethylenetetrahydrophthalic anhydride and 1 part of trisdimethylaminophenol were mixed with 100 parts of Epikote 828. The resulting composition had a pot life of only 5 days at room temperature. When the composition was heated at 125°C. for 20 hours, the resulting solid hardened product had a heat distortion temperature of 125°C.

EXAMPLE 21

Ten parts of 1,1,1-trimethylaminephenylcarbamoylimide was dispersed in 100 parts of Epikote 828. The resulting composition had a pot life of more than one month at 40°C. When 100 g of the composition was heated at 130°C. it was hardened in 5 hours, and when it was heated at 155°C., it was hardened in 2 hours to give a solid hardened product.

EXAMPLE 22

Each of the various aminimide compounds shown in Table 1 was added in the amount indicated to Epikote 828. The pot lives of the resulting compositions and the rate of hardening are shown in Table 1.

Table 1

| Run No. | Amideimide Compounds | Amount added (parts) | Pot life (days) | Hardening time (hrs.) |
|---|---|---|---|---|
| 1 | 1,1-dimethyl-1-benzylamine benzimide | 10 | >30 | 3 |
|   |   | 8 | " | 3 |
|   |   | 6 | " | 3.5 |
| 2 | 1,1-dimethyl-1-benzylamine propionimide | 10 | " | 3.5 |
|   |   | 8 | " | 3.5 |
|   |   | 6 | " | 4.5 |
| 3 | 1,1-dimethyl-1-benzylamine methacrylimide | 10 | " | 2.4 |
|   |   | 8 | " | 2.5 |
|   |   | 6 | " | 3.0 |
| 4 | bis-1,1-dimethyl-1-(2'-hydroxy-3'-allyloxypropyl) amine oxalimide | 10 | " | 0.2 |
|   |   | 8 | " | 1.0 |
|   |   | 6 | " | 1.5 |
| 5 | bis-1,1-dimethyl-1-(2'-hydroxy-3'-phenoxypropyl) amine oxalimide | 10 | " | 0.2 |
|   |   | 8 | " | 0.3 |
|   |   | 6 | " | 1.0 |
| 6 | bis-1,1-dimethyl-1-(2'-hydroxy-3'-butoxypropyl) amine oxalimide | 10 | " | 0.5 |
|   |   | 8 | " | 1.0 |
|   |   | 6 | " | 1.0 |
| 7 | bis-1,1-dimethyl-1-(2'-hydroxy-3'-methacryloyloxypropyl) amine oxalimide | 10 | 30 | 0.5 |
|   |   | 8 | >30 | 1.5 |
|   |   | 6 | " | 3.0 |
| 8 | 1,1-dimethyl-1-(2'-hydroxy-2'-phenylethyl) amine ethoxyoxalimide | 10 | 30 | 1.0 |
|   |   | 8 | >30 | 1.0 |
|   |   | 6 | " | 2.0 |
| 9 | 1,1-dimethyl-1-(2'-hydroxy-3'-phenoxypropyl) amine ethoxyoxalimide | 10 | " | 0.8 |
|   |   | 8 | " | 1.0 |
|   |   | 6 | " | 1.0 |
| 10 | 1,1-dimethyl-1-(2'-hydroxy-3'-methacryloyloxypropyl) amine ethoxymalonimide | 10 | 30 | 0.3 |
|   |   | 8 | " | 0.5 |
|   |   | 6 | >30 | 2.0 |
| 11 | 1,1-dimethyl-1-(2'-hydroxypropyl) amine methoxysuccinimide | 10 | " | 1.0 |
|   |   | 8 | " | 1.0 |
|   |   | 6 | " | 1.5 |
| 12 | 1,1-dimethyl-1-(2'-hydroxypropyl) amine methoxyphthalimide | 10 | >30 | 0.5 |
|   |   | 8 | " | 0.5 |
|   |   | 6 | " | 1.0 |
| 13 | 1,1-dimethyl-1-(2'-hydroxypropyl) amine methoxyisophthalimide | 10 | " | 1.2 |
|   |   | 8 | " | 1.2 |
|   |   | 6 | " | 1.5 |
| 14 | 1,1-dimethyl-1-(2'-hydroxypropyl) amine terephthalimide | 10 | " | 2.0 |
|   |   | 8 | " | 2.5 |
|   |   | 6 | " | 2.5 |
| 15 (Control) | Epi-Kure Z (trademark for curing agents for epoxy resins, product of Shell International Chemical Corporation) | 20 | >1.0 | 0.3 |
|   |   | 10 | " | 0.5 |

Note:
(1) Pot life: The composition is stored in an incubator at 40°C., and its viscosity is measured.
(2) Hardening time: The composition is coated on two glass sheets with an area of 5 cm². Then, the two glass sheets are laminated, and the time required for the composiition to cure in a hot air dryer at 155°C. is measured.

EXAMPLE 23

A specimen was prepared by mixing 80 parts of hexahydrophthalic anhydride and an aminimide compound in the amount shown in Table 2 below with 100 parts of Epikote 828. The specimen was divided into two parts. The gelling time of one part was measured at 155°C., and the usable period of the other part at room temperature was measured. The usable period was determined by measuring the change of viscosity with time by keeping the composition at room temperature by means of a Gardner-Holdt bubble viscometer. For comparison, the results of using benzyldimethylamine (BDMA) in place of the aminimide compound and also of using no aminimide compound are also given in Table 2.

wherein $R^1$ is an alkyl group, a benzyl group or the group

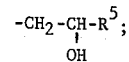

$R^2$ and $R^3$ are the same or different, and each represents an alkyl group; $R^4$ is an alkyl group, an aryl group, an aralkyl group, a cycloakyl group, an alkoxy group, aryloxy group, an alkenyl group,

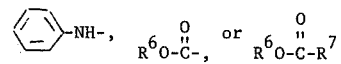

Table 2

| Aminimide Compound | Amount (part) | Gelation time (min.) | Initial viscosity | 2 days | 7 days | 15 days | 30 days |
|---|---|---|---|---|---|---|---|
| 1,1-dimethyl-1-(2'-hydroxypropyl) amine methoxyadipinimide | 0.2 | 21 | W⁻ | W⁻ | W⁻ | W⁻ | W⁻ |
|  | 1.0 | 9 | " | " | " | " | " |
|  | 2.0 | 3 | " | " | " | " | " |
|  | 10.0 | — | V⁻ | Y⁻ | Z-Z₁ | Z₄-Z₅ | Z₄-Z₅ |
| 1,1-dimethyl-1-(2'-hydroxypropyl) amine methoxyadipinimide | 0.2 | 18 | W⁻ | W⁻ | W⁻ | W⁻ | W⁻ |
|  | 1.0 | 9 | " | " | " | " | " |
|  | 2.0 | 4 | " | " | " | " | " |
| 1,1-dimethyl-1-(2'-hydroxy-3'-butoxypropyl) amine ethoxyoxalimide | 0.2 | 21 | " | " | " | " | " |
|  | 1.0 | 10 | " | " | " | " | " |
|  | 2.0 | 4 | " | " | " | " | " |
| 1,1-dimethyl-1-(2'-hydroxypropyl) amine ethoxyoxalimide | 0.2 | 18 | " | " | " | " | " |
|  | 1.0 | 7 | " | " | " | " | " |
|  | 2.0 | 6 | " | " | " | " | " |
|  | 10.0 | — | V⁻ | Y⁻ | Z-Z₁ | Z₄-Z₅ | Z₄-Z₅ |
| 1,1-dimethyl-1-(2'-hydroxypropyl) amine methoxyterephthalimide | 0.2 | 23 | W⁻ | W⁻ | W⁻ | W⁻ | W⁻ |
|  | 1.0 | 15 | " | " | " | " | " |
|  | 2.0 | 7 | " | " | " | " | " |
| 1,1-dimethyl-1-benzylamine benzimide | 0.2 | 18 | " | " | " | " | " |
|  | 1.0 | 6 | " | " | " | " | " |
|  | 2.0 | 4 | " | " | " | " | " |
| BDMA (control) | 0.05 | 36 | V⁻ | X-Y | Y | Z-Z₁ | Z₄-Z₅ |
| None | — | 3 hours | W⁻ | W⁻ | W⁻ | W⁻ | W⁻ |

What is claimed is:

1. Epoxy resin compositions of superior hardenability which consist essentially of a 1,2-epoxy resin, a polycarboxylic acid anhydride at an equivalent rate of 0.6 to 1.2 per equivalent of the epoxy resin and an aminimide compound of the formula

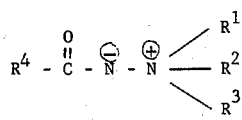

or

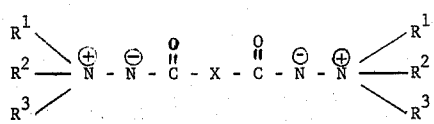

when $R^1$ is a benzyl group, and

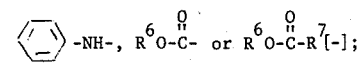

$R^5$ is a hydrogen atom, an alkyl group, an aryl group, an alkoxyalkyl group, an aryloxyalkyl group, an allyloxyalkyl group, a hydroxyalkyl group, a methacryoxymethyl group or an acryloxymethyl group; $R^6$ is an alkyl group, an aryl group or an aralkyl group; $R^7$ is a residue of an aliphatic, cycloaliphatic or aromatic hydrocarbon; and X is a direct bond in an amount of 0.1 to 5 parts by weight of the epoxy resin.

2. The composition of claim 1, wherein $R^2$ and $R^3$ are methyl radicals.

3. The composition of claim 2, wherein the aminimide compound is 1,1-dimethyl-1-benzylamine methacrylimide.

4. The composition of claim 2, wherein the aminimide compound is 1,1-dimethyl-1-benzylamine propionimide.

5. The compositions of claim 2, wherein the aminimide compound is 1,1-dimethyl-1-benzylamine benzimide.

6. The composition of claim 2, wherein the aminimide compound is 1,1-dimethyl-1-(2'-hydroxy-3'-allyloxypropyl) amine ethoxyoxalimide.

7. The composition of claim 2, wherein the aminimide compound is 1,1-dimethyl-1-(2'-hydroxypropyl) amine ethoxyoxalimide.

8. The composition of claim 2, wherein the aminimide compound is 1,1-dimethyl-1-(2'-hydroxy-3'-phenylethyl) amine ethoxyoxalimide.

9. The composition of claim 2, wherein the aminimide compound is 1,1-dimethyl-1-(2'-hydroxy-3'-butoxypropyl) amine ethoxyoxalimide.

10. The composition of claim 2, wherein the aminimide compound is 1,1-dimethyl-1-(2'-hydroxy-3'-phenoxypropyl) amine ethoxyoxalimide.

11. The composition of claim 2, wherein the aminimide compound is 1,1-dimethyl-1-(2'-hydroxypropyl) amine ethoxymalonimide.

12. The composition of claim 2, wherein the aminimide compound is 1,1-dimethyl-1-(2'-hydroxymethacryloxypropyl) amine ethoxymalonimide.

13. The composition of claim 2, wherein the aminimide compound is 1,1-dimethyl-1-(2'-hydroxypropyl) amine ethoxymalonimide.

14. The composition of claim 2, wherein the aminimide compound is 1,1-dimethyl-1-(2'-hydroxypropyl) amine methoxysuccinimide.

15. The composition of claim 2, wherein the aminimide compound is 1,1-dimethyl-1-(2'-hydroxypropyl) amine methoxyadipimide.

16. The composition of claim 2, wherein the aminimide compound is 1,1-dimethyl-1-(2'-hydroxypropyl) amine methoxysebacimide.

17. The composition of claim 2, wherein the aminimide compound is 1,1-dimethyl-1-(2'-hydroxypropyl) amine methoxyphthalimide.

18. The composition of claim 2, wherein the aminimide compound is 1,1-dimethyl-1-(2'-hydroxypropyl) amine methoxyisophthalimide.

19. The composition of claim 2, wherein the aminimide compound is 1,1-dimethyl-1-(2'-hydroxypropyl) amine methoxyterephthalimide.

20. The composition of claim 2, wherein the aminimide compound is 1,1,1-trimethylaminephenylcarbamoylimide.

21. The composition of claim 2, wherein the aminimide compound is bis-1,1-dimethyl-1-(2'-hydroxypropyl) amine oxalimide.

22. The composition of claim 2, wherein the aminimide compound is bis-1,1-dimethyl-1-(2'-hydroxy-3'-phenoxypropyl) amine oxalimide.

23. The composition of claim 2, wherein the aminimide compound is bis-1,1-dimethyl-1-(2'-hydroxy-3'-butoxypropyl) amine oxalimide.

24. The composition of claim 2, wherein the aminimide compound is bis-1,1-dimethyl-1-(2'-hydroxy-3'-allyloxypropyl) amine oxalimide.

25. The composition of claim 2, wherein the aminimide compound is bis-1,1-dimethyl-1-(2'-hydroxy-3'-methacryloyloxypropyl) amine oxalimide.

\* \* \* \* \*